US012616251B2

(12) United States Patent
Batista

(10) Patent No.: US 12,616,251 B2
(45) Date of Patent: May 5, 2026

(54) AEROSOL-GENERATING DEVICE WITH SEPARABLE VENTURI ELEMENT

(71) Applicant: PHILIP MORRIS PRODUCTS S.A., Neuchatel (CH)

(72) Inventor: Rui Nuno Batista, Morges (CH)

(73) Assignee: Philip Morris Products S.A., Neuchatel (CH)

( * ) Notice: Subject to any disclaimer, the term of this patent is extended or adjusted under 35 U.S.C. 154(b) by 438 days.

(21) Appl. No.: 17/615,903

(22) PCT Filed: Jun. 5, 2020

(86) PCT No.: PCT/EP2020/065598
§ 371 (c)(1),
(2) Date: Dec. 2, 2021

(87) PCT Pub. No.: WO2020/245338
PCT Pub. Date: Dec. 10, 2020

(65) Prior Publication Data

US 2022/0312851 A1 Oct. 6, 2022

(30) Foreign Application Priority Data

Jun. 6, 2019 (EP) .................................... 19178699

(51) Int. Cl.
*A24F 40/485* (2020.01)
*A24F 7/02* (2006.01)
(Continued)

(52) U.S. Cl.
CPC .............. *A24F 40/485* (2020.01); *A24F 7/02* (2013.01); *A24F 40/10* (2020.01); *A24F 40/20* (2020.01);
(Continued)

(58) Field of Classification Search
None
See application file for complete search history.

(56) References Cited

U.S. PATENT DOCUMENTS

| | | | |
|---|---|---|---|
| 4,284,089 | A | 8/1981 | Ray |
| 2014/0261492 | A1 | 9/2014 | Kane |

(Continued)

FOREIGN PATENT DOCUMENTS

| | | |
|---|---|---|
| JP | S55-050368 | 4/1980 |
| JP | H01-098470 | 4/1989 |

(Continued)

OTHER PUBLICATIONS

PCT International Search Report and Written Opinion for PCT/EP2020/065598 mailed Sep. 23, 2020 (13 pages).

(Continued)

*Primary Examiner* — Philip Y Louie
*Assistant Examiner* — Nicole A Szumigalski
(74) *Attorney, Agent, or Firm* — Mueting Raasch Group

(57) ABSTRACT

The invention relates to an aerosol-generating device comprising a main body, a mouthpiece, which is configured removably attachable to the main body and a two-piece Venturi portion. The two-piece Venturi portion comprises an inlet portion, an outlet portion, a main airflow channel extending between the inlet portion and the outlet portion and a constricted airflow channel arranged in the main airflow channel. The inlet portion of the two-piece Venturi portion is at least partly arranged in the main body when the mouthpiece is attached to the main body, and the outlet portion of the two-piece Venturi portion is at least partly arranged in the mouthpiece or integrated with the mouthpiece.

19 Claims, 5 Drawing Sheets

(51) Int. Cl.

| | |
|---|---|
| ***A24F 40/10*** | (2020.01) |
| ***A24F 40/20*** | (2020.01) |
| ***A24F 40/30*** | (2020.01) |
| ***A24F 40/46*** | (2020.01) |
| ***A24F 40/465*** | (2020.01) |
| ***H05B 3/34*** | (2006.01) |
| ***H05B 6/10*** | (2006.01) |
| ***H05B 6/36*** | (2006.01) |

(52) U.S. Cl.
CPC .............. *A24F 40/30* (2020.01); *A24F 40/46* (2020.01); *A24F 40/465* (2020.01); *H05B 3/34* (2013.01); *H05B 6/108* (2013.01); *H05B 6/36* (2013.01)

(56) References Cited

U.S. PATENT DOCUMENTS

| | | | | |
|---|---|---|---|---|
| 2017/0340018 | A1* | 11/2017 | Thorens ................... | H05B 3/44 |
| 2018/0125115 | A1* | 5/2018 | Mueller .................... | A24F 1/30 |
| 2018/0295885 | A1* | 10/2018 | Rojo-Calderon ........ | A24D 1/20 |
| 2019/0174827 | A1* | 6/2019 | Fernando ................. | H01R 4/48 |

FOREIGN PATENT DOCUMENTS

| | | | |
|---|---|---|---|
| WO | WO 2016/096497 | 6/2016 | |
| WO | WO 2016/124740 | 8/2016 | |
| WO | WO-2017186455 A1 * | 11/2017 | ............. A24D 3/061 |
| WO | WO 2018/167166 | 9/2018 | |

OTHER PUBLICATIONS

International Preliminary Report on Patentability for PCT/EP2020/065598 mailed Sep. 15, 2021 (13 pages).
Office Action issued in Japan for Application No. 2021-571693 dated Jan. 30, 2023 (6 pages). English translation included.

* cited by examiner

Fig. 3
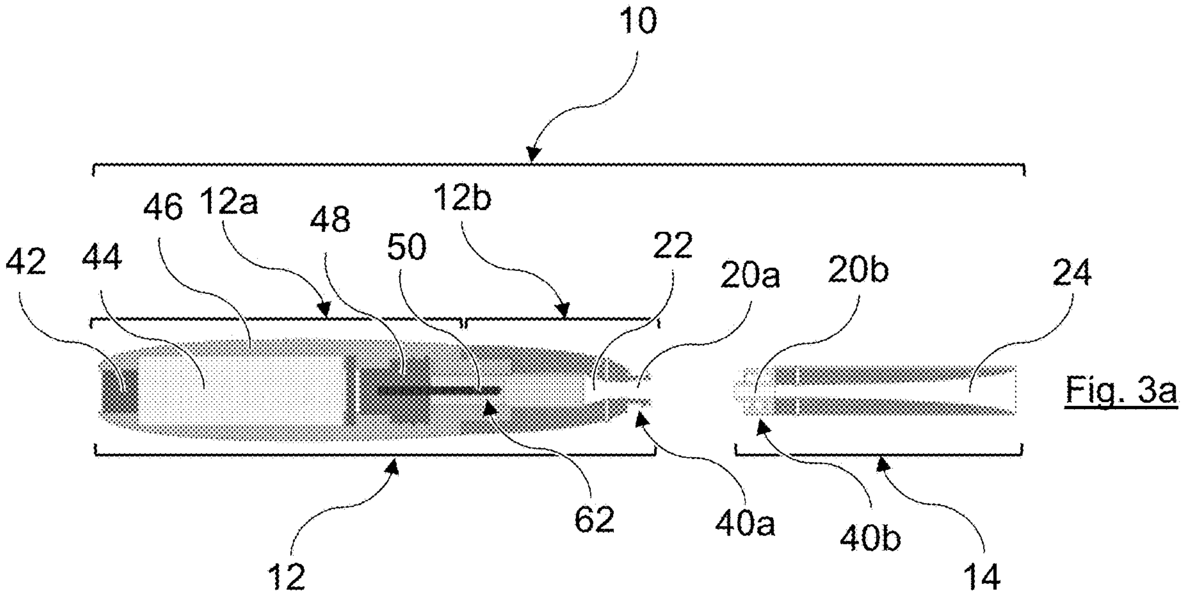
Fig. 3a
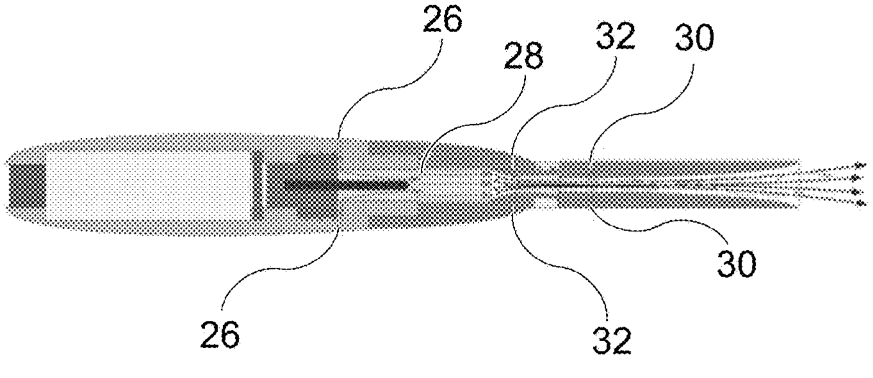
Fig. 3b
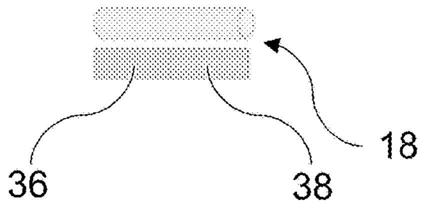
Fig. 3c

Fig. 5
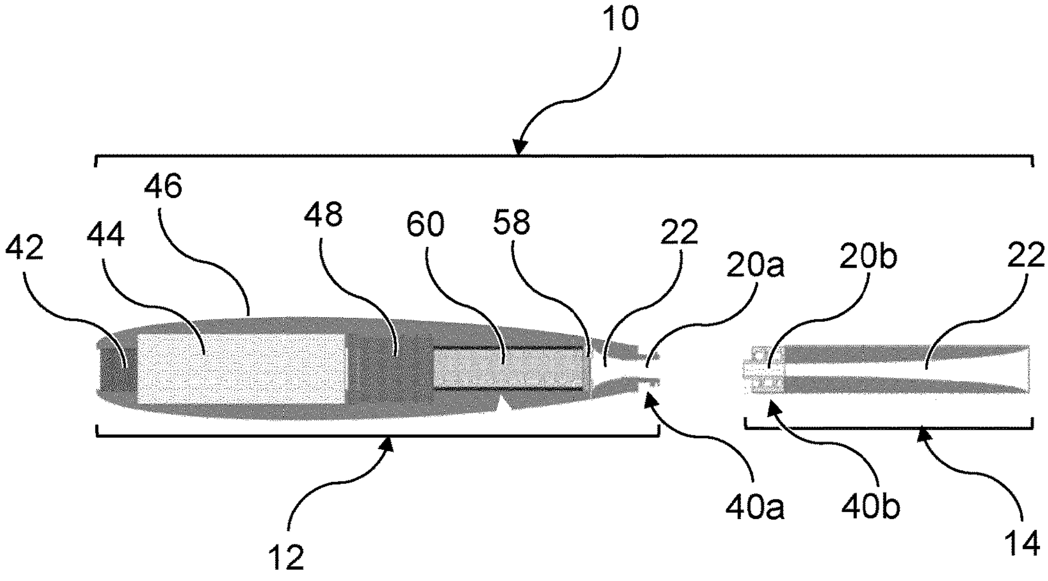
Fig. 5a
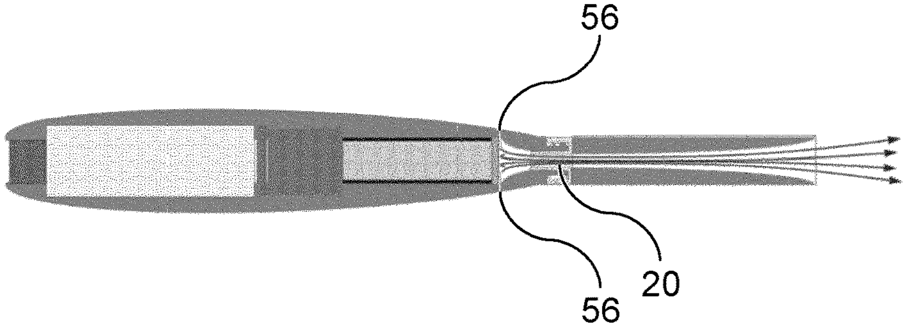
Fig. 5b
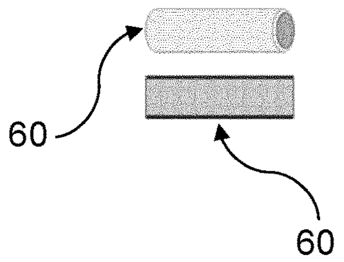
Fig. 5c

AEROSOL-GENERATING DEVICE WITH SEPARABLE VENTURI ELEMENT

This application is a U.S. National Stage Application of International Application No. PCT/EP2020/065598 filed Jun. 5, 2020, which was published in English on Dec. 10, 2020, as International Publication No. WO 2020/245339 A1. International Application No. PCT/EP2020/065598 claims priority to European Application No. 19178699.5 filed Jun. 6, 2019.

The present invention relates to an aerosol-generating device and a system comprising an aerosol generating device and an aerosol-generating article.

It is known to provide an aerosol-generating device for generating an inhalable vapor. Such devices may heat aerosol-forming substrate without burning the aerosol-forming substrate. Such aerosol-forming substrates may be provided as part of an aerosol-generating article. Such devices may be arranged to receive an aerosol-generating article comprising an aerosol-forming substrate. The aerosol-generating article may have a rod shape for insertion of the aerosol-generating article into a heating chamber of the aerosol-generating device. A heating element may be arranged in or around the heating chamber for heating the aerosol-forming substrate when the aerosol-generating article is inserted into the heating chamber of the aerosol-generating device. Typically, the aerosol-forming substrate is vaporized by the heating element and aerosol is subsequently formed. Aerosol formation, in particular droplet size, depends upon multiple factors such as cooling of the air downstream of the aerosol-forming substrate and air pressure. Furthermore, the ambient temperature and humidity may influence aerosol generation.

It would be desirable to have an aerosol-generating device with improved aerosol generation.

According to an aspect of the invention there is provided an aerosol-generating device comprising a main body, a mouthpiece, which is configured removably attachable to the main body and a two-piece Venturi portion. The two-piece Venturi portion is preferably a two-piece element throughout this disclosure. The two-piece Venturi portion comprises an inlet portion, an outlet portion, a main airflow channel extending between the inlet portion and the outlet portion and a constricted airflow channel arranged in the main airflow channel. The inlet portion of the two-piece Venturi portion is at least partly arranged in the main body when the mouthpiece is attached to the main body, and the outlet portion of the two-piece Venturi portion is at least partly arranged in the mouthpiece or integrated with the mouthpiece.

Providing a two-piece Venturi portion may enhance aerosol generation. Optimized droplets of the aerosol may be generated within the two-piece Venturi portion. Conventionally, an aerosol-generating article may have been provided containing elements such as a cooling section for cooling an air stream through the article and for generating an inhalable aerosol within the article itself. By providing a two-piece Venturi portion, as in the present invention, the aerosol-generating article may be constructed in a simpler way. For example, a cooling section could potentially be omitted. The two-piece Venturi portion may be configured for reducing the temperature of the air containing vaporized aerosol-forming substrate flowing through the two-piece Venturi portion. The two-piece Venturi portion, particularly the dimensions of the two-piece Venturi portion, is/are configured to generate an aerosol having an advantageous droplet size or advantageous ranges of preferred droplet sizes or an advantageous droplet size distribution.

Providing a two-piece Venturi portion in an aerosol-generating device, wherein the two-piece Venturi portion is partly in the main body and partly in the mouthpiece, may assure that only mouthpieces with the correct specifications can be attached to the main body of the aerosol-generating device. The manufacturer may thus be a position to secure that the correct type of mouthpieces may be attached to the main body of the aerosol-generating device. A consistent user experience and homogeneous gas mixture of the two-piece Venturi portion may thus be ensured.

One piece, preferably an upstream piece, of the two-piece Venturi portion may be part of the or may be integrated with the main body. Preferably, the inlet portion of the two-piece Venturi portion may be part of the or may be integrated with the main body. The upstream piece may comprise the inlet portion. The other piece, preferably a downstream piece, of the two-piece Venturi portion may be part of the or may be integrated with the mouthpiece. Preferably, the outlet portion of the two-piece Venturi portion may be part of the or may be integrated with the mouthpiece. The downstream piece may comprise the outlet portion. One or both of the main airflow channel and the constricted airflow channel may be part of the or may be integrated with the main body or the mouthpiece. Alternatively, one or both of the main airflow channel and the constricted airflow channel may be partly in or partly integrated with the main body and partly in or partly integrated with the mouthpiece. As an alternative to the two-piece Venturi portion being integrated with the main body and the mouthpiece, one or both of the upstream piece and the downstream piece of the two-piece Venturi portion may be provided as a separate element. Preferably, the two-piece Venturi portion is a two-piece Venturi element. The two-piece Venturi portion may be configured as a two-piece portion.

One or more of the inlet portion, constricted airflow channel and outlet portion of the two-piece Venturi portion may be configured as insertion parts. The insertion parts may be inserted into the main body and/or mouthpiece. The insertion parts of the two-piece Venturi portion may be manufactured separately from the further elements of the aerosol-generating device. The insertion parts of the two-piece Venturi portion may be manufactured in an injection moulding process. Ease-of-manufacture and inexpensive manufacture may be an advantage of providing a two-piece Venturi portion comprising insertion parts.

Interchangeability is an advantage of the removably attachable configuration of the mouthpiece of the aerosol-generating device. The mouthpiece may be interchangeable for different delivery profiles, different smoking experiences and different aerosol vaporizations. Different delivery profiles, different smoking experiences and different aerosol vaporization's may be referred to in the following as usage experience. Customization may be pleasant for the user, since a user may be able to adapt the usage experience to his/her personal preferences. A user may change the attached mouthpiece according to a desired usage experience. According to this aspect, the mouthpiece may be re-usable, which may reduce waste.

As used herein, an 'aerosol-generating device' relates to a device that interacts with an aerosol-forming substrate to generate an aerosol. The aerosol-forming substrate may be part of an aerosol-generating article, for example part of a smoking article. The aerosol-forming substrate may be part of a cartridge. The cartridge may comprise a liquid storage portion. The liquid storage portion may comprise an outlet that is configured to connect to an inlet of a micro pump. The liquid storage portion may be adapted for storing a liquid aerosol-forming substrate to be supplied to a vaporiser. The liquid storage portion may be configured as a container or a reservoir for storing liquid aerosol-forming substrate.

The cartridge may comprise a cover that covers the outlet of the liquid storage portion. The cover may be a pulled sticker or a seal, for example a film seal, which may protect the cartridge before use. The cover could be removed from the cartridge by hand before inserting the cartridge into the main unit. Preferably, the cover is punctured or pierced so that the cover opens automatically upon inserting the cartridge into the main unit.

The cartridge may be a disposable article to be replaced with a new cartridge once the liquid storage portion of the cartridge is empty or below a minimum volume threshold. Preferably, the cartridge is pre-loaded with liquid aerosol-forming substrate. The cartridge may be refillable.

The cartridge and its components may be made of thermoplastic polymers, such as polyether ether ketone (PEEK).

An aerosol-generating device may be a smoking device that interacts with an aerosol-forming substrate of an aerosol-generating article or cartridge to generate an aerosol that is directly inhalable into a user's lungs thorough the user's mouth. An aerosol-generating device may be a holder. The device is preferably a portable or handheld device that is comfortable to hold between the fingers of a single hand. The device may be an electrically heated smoking device.

The aerosol-generating device may comprise a housing, electric circuitry, a power supply, a heating chamber and a heating element.

The electric circuitry may comprise a microprocessor, which may be a programmable microprocessor. The microprocessor may be part of a controller. The electric circuitry may comprise further electronic components. The electric circuitry may be configured to regulate a supply of power to the heating element. Power may be supplied to the heating element continuously following activation of the system or may be supplied intermittently, such as on a puff-by-puff basis. The power may be supplied to the heating element in the form of pulses of electrical current. The electric circuitry may be configured to monitor the electrical resistance of the heating element, and preferably to control the supply of power to the heating element dependent on the electrical resistance of the heating element.

The aerosol-generating device may comprise a power supply, typically a battery, within a main body of the aerosol-generating device. In one aspect, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating element.

The heating chamber may be configured to receive one or more aerosol-generating articles. The heating chamber may receive the aerosol-forming substrate. The aerosol-forming substrate may be received in the aerosol-generating device. The heating chamber may surround the heating element. The heating chamber may be a cavity. The received aerosol-forming substrate may be heated. The received aerosol-forming substrate may be heated to an elevated temperature. The temperature may be the temperature at which one or more volatile compounds are released from the aerosol-forming substrate and at which the aerosol-forming substrate does not combust. The two-piece Venturi portion may be arranged connectable downstream to the heating chamber of the aerosol-generating device.

The aerosol-generating device may comprise an internal heating element, preferably a heating pin or heating blade, arranged in the heating chamber and configured for penetrating into the aerosol-forming substrate of the aerosol-generating article, when the aerosol-generating article is inserted into the heating chamber.

The heating element may be an internal heating element, where "internal" refer to the aerosol-forming substrate. The internal heating element may take any suitable form. The internal heating element may be one or more heating needles or pins or rods that run through the center of the aerosol-forming substrate, preferably arranged to at least partially penetrate an internal portion of the aerosol-forming substrate. The internal heating element may take the form of a heating blade.

The internal heater may take the form of a casing or substrate having different electro-conductive portions, or an electrically resistive metallic tube. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

The heating element may be an inductive heating element. The inductive heating element may comprise an induction coil and a susceptor. The induction coil may be arranged at least partly surrounding the heating chamber.

In general, the susceptor is a material that is capable of absorbing electromagnetic energy and converting it to heat. When located in an alternating electromagnetic field, typically eddy currents are induced and hysteresis losses occur in the susceptor causing heating of the susceptor. Changing electromagnetic fields generated by one or several inductors, for example, induction coils of an inductive heating device heat the susceptor, which then transfers the heat to the surrounding aerosol-forming substrate, such that an aerosol is formed. The heat transfer may be mainly by conduction of heat. Such a transfer of heat may be best, if the susceptor is in close thermal contact with tobacco material and aerosol former of the aerosol-forming substrate.

The susceptor may have the shape of a blade or pin for penetrating the aerosol-forming substrate of the aerosol generating article, preferably in the center of the aerosol-forming substrate, preferably in the center of a substrate portion of the aerosol-forming substrate. The susceptor may not be directly connected with the induction coil.

The susceptor may be formed from any material that can be inductively heated to a temperature sufficient to generate an aerosol from the aerosol-forming substrate. A preferred susceptor may comprise or consist of a ferromagnetic material, for example a ferromagnetic alloy, ferritic iron, or a ferromagnetic steel or stainless steel. A suitable susceptor may be, or comprise, aluminium. Preferred susceptors may be heated to a temperature in excess of 250° C.

Preferred susceptors may be metal susceptors, for example stainless steel. However, susceptor materials may also comprise or be made of graphite, molybdenum, silicon carbide, aluminum, niobium, Inconel alloys (austenite nickel-chromium-based superalloys), metallized films, ceramics such as for example zirconia, transition metals such as for example iron, cobalt, nickel, or metalloids components such as for example boron, carbon, silicon, phosphorus, aluminium.

Preferably, the susceptor material may be a metallic susceptor material.

The heating element may be configured as a mesh heater or coil and wick heater, arranged downstream of the liquid storage portion. This aspect is particularly preferred, if the aerosol-forming substrate is provided as a liquid aerosol-forming substrate stored in the liquid storage portion.

The heating element may be arranged downstream of the liquid storage portion, preferably at an opening of the liquid storage portion. The opening of the liquid storage portion may be provided at the downstream end of the liquid storage portion. The heating element may extend across the opening of the liquid storage portion. The heating element may have at least the same shape and size as the opening of the liquid storage portion. The heating element may completely cover the opening of the liquid storage portion. The liquid aerosol-forming substrate, which is comprised by the liquid storage portion, may be vaporized by the heating element. The vaporized liquid aerosol-forming substrate may escape through the heating element. The vaporized liquid aerosol-forming substrate may escape through the heating element into the two-piece Venturi portion, preferably into the inlet portion of the two-piece Venturi portion. Due to the arrangement of the heating element downstream of the liquid storage portion, the aerosol generation may be adjacent, preferably close by the liquid storage portion.

The heating element may be a mesh heater, a coil heater, a coil and wick heater, a capillary tube heater or a metal plate heater. The heater may be a resistive heater which receives electrical power and transforms at least part of the received electrical power into heat energy. The heating element may comprise only a single heating element or a plurality of heating elements. The temperature of the heating element or elements is preferably controlled by the electric circuitry. The electrically resistive heating element and the inductive heating element may be battery-powered heating elements.

The electrically resistive heating element may be a heating element, which comprises an electrically resistive material. Suitable electrically resistive materials may include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

The electrically resistive heating element may be formed using a metal having a defined relationship between temperature and resistivity. The metal may be formed as a track on a suitable insulating material, such as ceramic material, and then sandwiched in another insulating material, such as a glass. Heaters formed in this manner may be used to both heat and monitor the temperature of the heating elements during operation.

The two-piece Venturi portion is configured as a two-piece Venturi portion. One piece of the two-piece Venturi portion may be provided separate from the main body, but connectable with the main body. One piece of the two-piece Venturi portion may be integrally formed with the main body, preferably the inlet portion of the two-piece Venturi portion. One piece of the two-piece Venturi portion may be configured as the mouthpiece of the aerosol-generating device, preferably the outlet portion of the two-piece Venturi portion. One piece of the two-piece Venturi portion may be configured as a separate mouthpiece connectable with the main body.

The aerosol-generating device may comprise a connection portion. The connection portion may comprise a first connection portion and a second connection portion. The first connection portion may be part of the main body. The second connection portion may be part of the mouthpiece. The main body may comprise the first connection portion for connecting to the mouthpiece. The mouthpiece may comprise the second connection portion for connecting to the main body.

The connection portion may be a form fit connection portion. The form fit connection portion may be a plug connection portion. The connection portion may be a mechanical connection portion.

The plug connection portion may be a male-female connection portion. The male-female connection portion may comprise a male connection portion and a female connection portion. The male connection portion may be a jack. The female connection portion may be a plug. The second connection portion may be the male connection portion and the first connection portion may be the female connection portion or vice versa.

The mechanical connection portion may comprise an O-ring connection portion or a rotary connection portion or a snap-fit connection portion. The rotary connection portion may be a bayonet mount or a screw connection portion. The screw-connection portion may be a threaded connection. The threaded connection portion may comprise threaded connection portions, i.e. a component with an external thread and a component with an internal thread. Using a screw-connection portion, the mouthpiece may comprise an internal thread, preferably a female thread and the main body may comprise an external thread, preferably a male thread, or vice versa.

The connection portion may be a frictional locking connection portion. The connection portion may be a magnetic connection portion.

The connection portion may be a combination of at least two of any of the preceding connection portions. For example, the mouthpiece may be connected with the main body by means of a plug connection portion and additionally by a screw connection portion, preferably a combination of male-female connection portions and threaded connection portions.

The aerosol-generating device may comprise a sealing element. The aerosol-generating device may comprise more than one sealing element. The sealing element may fascilitate a tight connection between the main body and the mouthpiece. The sealing element may be arranged at the connection portion. The sealing element may be arranged in a recess or groove. The connection portion may comprise the recess or groove. The sealing element may be configured as an O-ring. The O-ring connection portion may comprise an O-ring as a sealing element. The O-ring may be arranged at the female connection portion. The O-ring may be arranged at the male connection portion. The O-ring connection portion may comprise more than one sealing elements as described herein. The sealing element may be a rubber fastener seal. More than one sealing elements may be provided.

The mouthpiece may be removably attachable to the main body. The mouthpiece may be exchangeable by a new/another one. The mouthpiece may be configured with different characteristics, as described below. The mouthpiece may be configured with a optical or haptic cover. The optical cover may be configured with a colour, preferably a unicolour, more preferably colourful. The haptic cover may be configured with one or more embossments. The haptic cover may be configured with one or more overprints. The cover of the mouthpiece may be configured with optical and haptic elements. For example, the cover of the mouthpiece may be unicolour with one or more embossments. Customization of the mouthpiece may be enabled for a user by changing the attached mouthpiece according to a desired cover design.

The removably attachable mouthpiece may be provided with a marker arranged on the outside of the mouthpiece. The marker may be an optical marker or a haptic marker. The marker may be a borderline, preferably a borderline comprises a color. Alternatively or additionally, the marker may comprise a surface structure to identify the marker. The marker may assist the user to attach the mouthpiece in the right direction. The marker may specify the correct attachment of the mouthpiece. For example, the removably attachable two-piece Venturi portion may be provided with a marker, preferably arranged on the outside of the mouthpiece, more preferably on the outside adjacent the connection portion of the mouthpiece.

The two-piece Venturi portion is configured to utilize the venturi effect. In other words, the two-piece Venturi portion has a shape such that the venturi effect occurs, when fluid flows through the two-piece Venturi portion. The two-piece Venturi portion may be configured to utilize or provide the venturi effect as described below. The two-piece Venturi portion may comprise an airflow channel arranged along the longitudinal axis of the two-piece Venturi portion. The airflow channel may be a central airflow channel.

The airflow channel may be arranged along the longitudinal axis of the two-piece Venturi portion. The longitudinal axis of the aerosol-generating device may align with the longitudinal axis of the two-piece Venturi portion. In other words, the airflow channel of the two-piece Venturi portion may be aligned with the aerosol-generating device such that air may be drawn through the aerosol-generating device and into the airflow channel of the two-piece Venturi portion for subsequent inhalation by a user.

The venturi effect is the reduction of the pressure of a fluid during flow of the fluid through a constricted airflow passage. The structural elements of the two-piece Venturi portion of the present invention will be described in more detail below. The fluid flowing through the two-piece Venturi portion may be one or more of air, air comprising or entrained with vaporized aerosol-forming substrate and aerosol. In the following, for simplicity if the term 'air' will be used, this term may encompass air, air comprising or entrained with vaporized aerosol-forming substrate, aerosol, or any mixture thereof. Preferably, air comprising vaporized aerosol-forming substrate flows through the constricted airflow channel of the two-piece Venturi portion. After exiting the constricted airflow channel of the two-piece Venturi portion, the air may expand and accelerate, consequently cool down. The cooling of the air may lead to droplet formation and therefore aerosol generation.

The two-piece Venturi portion may be located immediately downstream of the aerosol-generating article comprising the solid aerosol-forming substrate and may abut an aerosol-forming article. Alternatively, the two-piece Venturi portion may be located immediately downstream of the cartridge holding the liquid aerosol-forming substrate and may abut the cartridge.

As used herein, the terms 'upstream' and 'downstream' are used to describe the relative positions of components, or portions of components, of the two-piece Venturi portion and the aerosol-generating article or cartridge according to the invention in relation to the direction of air drawn through the two-piece Venturi portion and the aerosol-generating article or cartridge during use thereof. The term 'downstream' may be understood as being closer to a mouth end than a distal end and. The term 'upstream' may be understood as being closer to a distal end than to a mouth end.

The two-piece Venturi portion may comprise a main airflow channel, wherein the main airflow channel may run through the inlet portion, the constricted airflow channel and the outlet portion. The main airflow channel may also be denoted as airflow channel.

The inlet portion of the two-piece Venturi portion may be configured converging towards the constricted airflow channel of the two-piece Venturi portion and the outlet portion of the two-piece Venturi portion may be configured diverging from the constricted airflow channel.

The inlet portion may be arranged adjacent to an upstream end of the two-piece Venturi portion. The outlet portion may be arranged adjacent to a downstream end of the two-piece Venturi portion. The inlet portion may be arranged opposite the outlet portion. The constricted airflow channel may be arranged between the inlet portion and the outlet portion. The inlet portion may be arranged in direct abutment with the constricted airflow channel. The constricted airflow channel may be arranged in direct abutment with the outlet portion. The inlet portion may be configured for entry of air into the two-piece Venturi portion. The outlet portion may be configured to allow air being drawn out of the two-piece Venturi portion. The inlet portion, the constricted airflow channel and the outlet portion may be fluidly connected with each other. The inlet portion, the constricted airflow channel and the outlet portion together may form the airflow channel of the two-piece Venturi portion. The inlet portion, the constricted airflow channel and the outlet portion may together enable airflow through the two-piece Venturi portion.

The term 'converging' may denote that the inner diameter of the inlet portion may decrease towards the constricted airflow channel. In other words, the inner diameter of the inlet portion may decrease from the upstream direction towards the downstream direction. The inlet portion may have a hollow conical shape. The inlet portion may be tapered towards the constricted airflow channel.

The term 'diverging' may denote that the inner diameter of the outlet portion may increase towards the downstream end of the two-piece Venturi portion. In other words, the inner diameter of the outlet portion may increase from the upstream direction towards the downstream direction. The outlet portion may have a hollow conical shape. The outlet portion may be tapered towards the constricted airflow channel. The constricted airflow channel may have a constant diameter.

The inlet portion, the constricted airflow channel and the outlet portion may have a circular cross-section. The inlet portion, the constricted airflow channel and the outlet portion may have differing cross-sections. One or more of the inlet portion, the constricted airflow channel and the outlet portion may have a circular, oval, rectangular or differently shaped cross-section. The only requirement of the two-piece Venturi portion is that the cross-sectional area of the constricted airflow channel is smaller than the cross-sectional area of the outlet portion so that the constricted airflow channel constitutes a constricted airflow passage. The constricted airflow channel is the portion with the smallest diameter between the inlet portion and the outlet portion.

The different characteristics may be realized by the structural configuration of the outlet portion of the two-piece Venturi portions. The different characteristics may arise from different configurations of the airflow channels of the individual two-piece Venturi portions, preferably of the outlet portions, more preferably of the outlet angles or length of the outlet portions or of the outlet angles and length of the outlet portions. The characteristics may define the usage experience.

The angle between the longitudinal axis of the inlet portion and a inner wall of the inlet portion may be referred to as inlet angle. The longitudinal axis of the inlet portion may be identical to the longitudinal axis of the two-piece Venturi portion. The inlet angle may influence the size of the formed droplets during the generation process.

The angle between the longitudinal axis of the outlet portion and a inner wall of the outlet portion may be referred to as outlet angle. The longitudinal axis of the outlet portion may be identical to the longitudinal axis of the two-piece Venturi portion. The outlet angle may influence delivery of the aerosol.

In this regard, aerosol flow direction may be influenced by the outlet angle. The direction of aerosol exiting the two-piece Venturi portion may be influenced in a desired way by choosing a specific outlet angle. Furthermore, the exiting velocity of the aerosol may be influenced by the outlet angle. The exiting velocity may denote the velocity of the aerosol flow when exiting the two-piece Venturi portion. By means of one or more of the direction of the aerosol and the velocity of the aerosol leaving the two-piece Venturi portion, the area of aerosol delivery in a user's mouth may be influenced in a desired way. Thus, the area of the aerosol delivery may be optimized by the specific outlet angle. The area of aerosol delivery may be within the throat of a user. It may be desirable to create a delivery experience closer to the mouth or closer to the back of the throat. This delivery experience may be influenced by the outlet angle.

The device may comprise at least a first air inlet arranged adjacent or upstream of the inlet portion of the two-piece Venturi portion, wherein the first air inlet is fluidly connected with the main airflow channel of the two-piece Venturi portion.

Providing a first air inlet may enhance features in air-flow management. The first air inlet may enable the production of a homogeneous mixture of aerosol. The particle size range and the temperature of aerosol at the outlet of the mouthpiece may also be adequate homogenized. The first air inlet may create an airflow channel. Ambient air may be drawn into the aerosol-generating device and towards the main airflow channel through the first air inlet. The main airflow channel, generated at the aerosol-forming substrate through the two-piece Venturi portion, may be combined with the airflow channel created by the first air inlet. The airflow channel may sufficiently homogenise the aerosol by supplying ambient air to the vaporized aerosol-forming substrate.

The first air inlet may be arranged at a wall of the housing of the aerosol-generating device, preferably the wall upstream of the heating element. The first air inlet may be configured as multiple air inlets, preferably two air inlets. One air inlet may be arranged opposite of the other air inlet. The first air inlet may extend from the wall through the aerosol-generating device to the aerosol-generating article, preferably to the main airflow channel of the aerosol-generating article or to the main airflow channel. The first air inlet may be configured perpendicular to the extension of the aerosol-generating article and/or to the extension of the main airflow channel. The vacuum created in the venturi effect may draw ambient air through the first air inlet into the aerosol-generating device. The first air inlet may supply fresh air to the main airflow channel. The airflow channel of the two-piece Venturi portion and the airflow channel of the air inlet may merge or mix.

The air inlet may be a semi-open inlet. The air inlet may for example be a semi-permeable membrane, permeable in one direction only for air, but is air- and liquid-tight in the opposite direction. The air inlet may for example also be a one-way valve. The air inlets may allow air to pass through the inlet only if specific conditions are met, for example a minimum depression in the aerosol-generating device or a volume of air passing through the valve or membrane. Air or liquid may be prevented from leaving the aerosol-generating device through the semi-open inlet.

The first air inlet may be configured as one or more hollows, preferably apertures or bores or grooves. The shape of the hollow may be round or elongated or oval or edged.

The first air inlet may be fluidly connected with the main airflow channel of the two-piece Venturi portion. The first air inlet may supply ambient air, preferably fresh air to the main airflow channel. The first air inlet may be provided in the main body, preferably in the main body upstream of the aerosol-generating article. The venturi effect may draw ambient air through the first air inlet into the aerosol-generating device, preferably into the main body, more preferably into the main airflow channel.

The main airflow channel may be the airflow channel of the two-piece Venturi portion. The main airflow channel may be arranged along the longitudinal axis of the two-piece Venturi portion. The airflow may comprise one or more of air, vaporized aerosol-generating substrate and aerosol. The airflow may extend from an upstream end of the inlet portion or from the aerosol-generating article, preferably from the heating chamber. The airflow may flow into and through the inlet portion, through the constricted airflow channel and through the outlet portion.

The device may comprise at least a second air inlet arranged adjacent the constricted airflow channel of the two-piece Venturi portion. The second air inlet may be fluidly connected with the main airflow channel.

Optimized mixing is an advantage of providing a second air inlet, which is fluidly connected to the main airflow channel. Ambient air, preferably fresh air, which flows through the first air inlet, may be saturated with vaporized aerosol-forming substrate. This homogenised aerosol may be mixed with fresh air from the second air inlet. This additional mixing of ambient air, preferably fresh air, may enhance the adequate homogenization of the aerosol.

The second air inlet may be provided at the mouthpiece, preferably upstream of the outlet portion of the two-piece Venturi portion. Preferably, the second air inlet is provided downstream of the inlet portion of the two-piece Venturi portion.

The venturi effect, more preferably the vacuum created by the venturi effect, may draw ambient air through the second air inlet into the aerosol-generating device, preferably into the mouthpiece, more preferably into the main airflow channel. The venturi effect may draw ambient air through a secondary airflow channel into the main airflow channel.

The second air inlet may be fluidly connected with the main airflow channel at the constricted airflow channel, preferably at the downstream end of the constricted airflow channel.

The secondary airflow channel may be the airflow channel of the second air inlet. The secondary airflow channel may extend the entire length of the second air inlet. The length of the second air inlet may extend from an opening of the second air inlet at a housing of the mouthpiece to the main airflow channel.

The mouthpiece may comprise a labyrinth. The labyrinth may be provided in the outlet portion of the two-piece Venturi portion. The airflow may pass the labyrinth. The labyrinth may improve the mixing of the airflows, preferably the mixing of the ambient air with the aerosol of the main airflow channel. The labyrinth may optimize the temperature of the aerosol. In this regard, the labyrinth may increase the length of the path of the airflow through the two-piece Venturi portion and therefore the cooling of the aerosol when flowing through the two-piece Venturi portion. The labyrinth may improve the aerosol generation.

The aerosol-generating device may comprise a third air inlet. The third air inlet may be provided at the main body, preferably downstream of the inlet portion of the two-piece Venturi portion. The third air inlet is preferably arranged upstream of the constricted airflow channel of the two-piece Venturi portion. The third air inlet is preferably arranged between the inlet portion of the two-piece Venturi portion and the constricted airflow channel of the two-piece Venturi portion. The third inlet may further enhance the homogenization of the aerosol by drawing ambient air into the main airflow channel.

Each of the air inlets may be configured closable. Closing of an air inlet may prevent airflow through the air inlet. The closing of one of the air inlets may be facilitated manually. The closing of one of the air inlets may be facilitated automatically.

The constricted airflow channel of the two-piece Venturi portion may be configured as a venturi nozzle.

Providing a venturi nozzle at the constricted airflow channel of the two-piece Venturi portion may optimize the aerosol generation. The reduction of pressure in the venturi nozzle, due to the venturi effect, may draw the air out of the venturi nozzle into the outlet portion as a optimized generated aerosol, preferably adequate homogenised aerosol.

The venturi nozzle may partially be provided in the main body and partially in the mouthpiece.

As used herein, the term ‘nozzle’ may denote a device, preferably a pipe or a tube, which controls the direction of the flow of a fluid or modify the flow of a fluid. For example, flow, speed, direction, mass, shape, and/or the pressure of the stream that emerges from them.

The inlet portion may be configured converging towards the main airflow channel and the outlet portion may be configured diverging from the main airflow channel. The inlet portion may be configured converging towards the constricted airflow channel and the outlet portion may be configured diverging from the constricted airflow channel.

The inlet portion may be provided at the main body. The inlet portion may lead toward the constricted airflow channel two-piece Venturi portion. The outlet portion may be provided at the mouthpiece for optimized aerosol generation.

The main body may comprise a first portion of the main airflow channel of the two-piece Venturi portion. The mouthpiece may comprise a second portion of the main airflow channel of the two-piece Venturi portion.

The two-piece Venturi portion may be formed after attaching the main body to the mouthpiece. The two-piece Venturi portion may be formed after attaching the first portion of the main airflow channel of the two-piece Venturi portion to the second portion of the main airflow channel of the two-piece Venturi portion.

The first portion of the main airflow channel of the two-piece Venturi portion may comprise a first portion of the venturi nozzle, and the second portion of the main airflow channel of the two-piece Venturi portion may comprise a second portion of the venturi nozzle. Preferably, the first portion of the main airflow channel is or comprises the inlet portion. Preferably, the second portion of the main airflow channel is or comprises the outlet portion.

The venturi nozzle may be formed after attaching the main body to the mouthpiece. The venturi nozzle may be formed after attaching the first portion of the main airflow channel of the two-piece Venturi portion to the second portion of the main airflow channel of the two-piece Venturi portion.

The first portion of the venturi nozzle may be provided in the main body, preferably in the outlet of the main body. The second portion of the venturi nozzle may be provided in the mouthpiece, preferably in the inlet of the mouthpiece. The outlet of the main body may provide a reduced diameter compared to the inlet portion of the two-piece Venturi portion in the main body. The inlet of the mouthpiece may provide a reduced diameter compared to the outlet portion of the two-piece Venturi portion in the mouthpiece. The reduced diameters may provide a venturi nozzle after attachment of the main body and the mouthpiece.

In some embodiments, the two-piece Venturi portion may be fully integrated in the mouthpiece. The inlet portion as well as the outlet portion of the two-piece Venturi portion may be arranged in the mouthpiece. The inlet portion may be arranged at an upstream end of the mouthpiece. The outlet portion may be arranged downstream of the inlet portion. The constricted airflow channel may be arranged between the inlet portion and outlet portion. When the mouthpiece is attached to the main body, the mouthpiece may be at least partly inserted into the main body. The inlet portion may be arranged to be inserted into the main body initially, when the mouthpiece is attached to the main body. After attachment of the mouthpiece to the main body, the inlet portion of the two-piece Venturi portion may be arranged in the main body but still be an integral part of the mouthpiece.

The main body may be a two-piece main body. The main body may comprise a first portion and a second portion.

The first portion may comprise the power supply, the electric circuity, the heating chamber, the heating element and at least partly the aerosol-generating article.

The second portion may be configured removably attachable to the first portion. The first portion and the second portion of the main body may be attached by an attachment portion. The attachment portion may comprise a sealing element so as to be tight. The attachment portion may be facilitated by a first attachment portion and a second attachment portion. The first attachment portion may be arranged at the first portion of the main body. The second attachment portion may be arranged at the second portion of the mouthpiece. The attachment portion may be any type of connection portion as described above with reference to the connection between the main body and the mouthpiece.

The inlet portion of the two-piece Venturi portion may be arranged in the second portion of the main body. The main body may be configured such that the aerosol-generating article comprising aerosol-forming substrate is insertable into the heating chamber of the main body, when the first portion and the second portion of the main body are detached. The aerosol-generating article may be held between the first portion of the main body and the second portion of the main body. The aerosol-generating article may be fully surrounded by the first portion of the main body and the second portion of the main body after attachment of the first and second portions of the main body.

Manufacturing a two-piece main body may enable the use of an aerosol-generating article comprising a solid aerosol-forming substrate with the aerosol-generating device.

The aerosol-generating article may be arranged upstream of the two-piece Venturi portion. The aerosol-generating article may be arranged adjacent to the inlet portion of the two-piece Venturi portion, preferably adjacent to the distel end of the inlet portion of the two-piece Venturi portion. The aerosol-generating article may be arranged partly in the first portion of the main body and partly in the second portion of the mouthpiece. The aerosol-generating article may be arranged in the heating chamber.

As used herein, the term 'aerosol-generating article' refers to an article comprising an aerosol-forming substrate. As used herein, the term 'aerosol-generating substrate' refers to a material that is capable of releasing volatile compounds that can form an aerosol. For example, an aerosol-forming substrate may be arranged to generate an aerosol that is directly inhalable into a user's lungs through the user's mouth. An aerosol-generating article may be disposable.

The aerosol-generating article may comprise the substrate portion comprising the aerosol-forming substrate and a filter portion. The filter portion preferably is arranged downstream of the substrate portion. Preferably, the two-piece Venturi portion is arranged downstream of the filter portion. The substrate portion may be arranged in direct abutment to the filter portion. The filter portion may be arranged in direct abutment with the two-piece Venturi portion.

The filter portion may comprise for example a hollow tubular filter portion, preferably a hollow acetate tube (HAT), a fine hollow acetate tube (FHAT) or a plug of tow wrapped around a central cardboard tube, all of which structures being known from manufacture of filter elements used in aerosol-generating articles. The filter portion preferably comprises a hollow central bore.

The filter portion may be formed from any suitable material or combination of materials. For example, the filter portion may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the filter portion is formed from cellulose acetate.

The filter portion may comprise a hollow tubular element. In a preferred embodiment, the filter portion comprises a hollow cellulose acetate tube.

The filter portion preferably has an external diameter that is approximately equal to the external diameter of the aerosol-generating article.

The filter portion may have an external diameter of between approximately 4 mm and approximately 8 mm. For example, the filter portion may have an external diameter of between approximately 5 mm and approximately 6 mm. In some embodiments, the filter portion may have an external diameter of around 5.3 mm. The filter portion may have a length of between approximately 10 mm and approximately 25 mm. In some embodiments, the filter portion may have a length of approximately 13 mm.

The aerosol-generating article may be substantially cylindrical in shape. However, alternatively other cross sections may be used. Indeed, the cross section of the aerosol-generating article may vary along its length, for example by varying the shape of the cross section or the cross sectional dimensions. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between 30 mm and 60 mm, preferably between 40 mm and 50 mm, more preferably 45 mm. The aerosol-generating article may have an external diameter between approximately 4 mm and 8 mm, preferably between 5 mm and 6 mm, more preferably around 5.3 mm. In one embodiment, the aerosol-generating article has a total length of approximately 45 mm. Further, the aerosol-forming substrate may have a length of between 10 mm to 55 mm, preferably between 20 mm and 55 mm. The aerosol-generating article may comprise an outer paper wrapper.

The aerosol-generating article may comprise a portion of aerosol-forming substrate. The aerosol-forming substrate is a substrate capable of releasing volatile compounds that can form an aerosol. An aerosol-forming substrate may conveniently be part of an aerosol-generating article or the aerosol-generating article. The volatile compounds may be released by heating the aerosol-forming substrate. The aerosol-forming substrate may comprise nicotine. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may be a non-liquid aerosol-forming substrate. Alternatively, the aerosol-forming substrate may comprise both non-liquid and liquid components. As a further alternative, the aerosol-forming substrate may be provided in a liquid form.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are for example: polyhydric alcohols, such as triethylene glycol, 1,3-butanediol and glycerine; esters of polyhydric alcohols, such as glycerol mono-, di- or triacetate; and aliphatic esters of mono, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The aerosol-former may be propylene glycol. The aerosol former may comprise both glycerine and propylene glycol.

Preferably, the amount of aerosol former is between 6 percent and 20 percent by weight on a dry weight basis of the aerosol-forming substrate, more preferably, the amount of aerosol former is between 8 percent and 18 percent by weight on a dry weight basis of the aerosol-forming substrate, most preferably the amount of aerosol former is between 10 percent and 15 percent by weight on a dry weight basis of the aerosol-forming substrate. For some embodiments the amount of aerosol former has a target value of about 13 percent by weight on a dry weight basis of the aerosol-forming substrate. The most efficient amount of aerosol former will depend also on the aerosol-forming substrate, whether the aerosol-forming substrate comprises plant lamina or homogenized plant material. For example, among other factors, the type of substrate will determine to which extent the aerosol-former can facilitate the release of substances from the aerosol-forming substrate.

The aerosol-forming substrate may be non-liquid aerosol-forming substrate. The non-liquid aerosol-forming substrate may comprise plant-based material. The non-liquid aerosol-forming substrate may comprise tobacco. The non-liquid aerosol-forming substrate may comprise homogenised plant-based material, including homogenized tobacco, for example made by, for example, a paper making process or a casting process. An aerosol-generating article comprising non-liquid aerosol-forming substrate comprising tobacco may be referred to as a tobacco stick. Preferably, the aerosol-forming substrate is non-liquid.

Advantageously, a more natural taste and appearance of the aerosol-generating article can be achieved by using natural plant material lamina. The term "lamina" refers to the part of a plant leaf blade without the stem.

If the aerosol-forming substrate is non-liquid aerosol-forming substrate, preferably a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, homogenised sheet tobacco, preferably reconstituted tobacco, more preferably cast leaf tobacco, extruded tobacco, and expanded tobacco.

The non-liquid aerosol-forming substrate may be deposited on the surface of a carrier in the form of, for example, a sheet, foam, gel or slurry. The non-liquid aerosol-forming substrate may be deposited on the entire surface of the carrier, or alternatively, may be deposited in a pattern in order to provide a non-uniform flavor delivery during use.

Preferably, the non-liquid aerosol-forming substrate comprises cut-filler. In this document, "cut-filler" is used to refer to a blend of shredded plant material, in particular leaf lamina, processed stems and ribs, homogenized plant material, like for example made into sheet form using casting or papermaking processes. The cut filler may also comprise other after-cut, filler tobacco or casing. According to preferred embodiments of the invention, the cut-filler comprises at least 25 percent of plant leaf lamina, more preferably, at least 50 percent of plant leaf lamina, still more preferably at least 75 percent of plant leaf lamina and most preferably at least 90 percent of plant leaf lamina. Preferably, the plant material is one of tobacco, mint, tea and cloves, however, the invention is equally applicable to other plant material that has the ability to release substances upon the application of heat that can subsequently form an aerosol.

Preferably, the tobacco plant material comprises lamina of one or more of bright tobacco lamina, dark tobacco, aromatic tobacco and filler tobacco. Bright tobaccos are tobaccos with a generally large, light coloured leaves. Throughout the specification, the term "bright tobacco" is used for tobaccos that have been flue cured. Examples for bright tobaccos are Chinese Flue-Cured, Flue-Cured Brazil, US Flue-Cured such as Virginia tobacco, Indian Flue-Cured, Flue-Cured from Tanzania or other African Flue Cured. Bright tobacco is characterized by a high sugar to nitrogen ratio. From a sensorial perspective, bright tobacco is a tobacco type which, after curing, is associated with a spicy and lively sensation. According to the invention, bright tobaccos are tobaccos with a content of reducing sugars of between about 2.5 percent and about 20 percent of dry weight base of the leaf and a total ammonia content of less than about 0.12 percent of dry weight base of the leaf. Reducing sugars comprise for example glucose or fructose. Total ammonia comprises for example ammonia and ammonia salts. Dark tobaccos are tobaccos with a generally large, dark coloured leaves. Throughout the specification, the term "dark tobacco" is used for tobaccos that have been air cured. Additionally, dark tobaccos may be fermented. Tobaccos that are used mainly for chewing, snuff, cigar, and pipe blends are also included in this category. Typically, these dark tobaccos are air cured and possibly fermented. From a sensorial perspective, dark tobacco is a tobacco type which, after curing, is associated with a smoky, dark cigar type sensation. Dark tobacco is characterized by a low sugar to nitrogen ratio. Examples for dark tobacco are Burley Malawi or other African Burley, Dark Cured Brazil Galpao, Sun Cured or Air Cured Indonesian Kasturi. According to the invention, dark tobaccos are tobaccos with a content of reducing sugars of less than about 5 percent of dry weight base of the leaf and a total ammonia content of up to about 0.5 percent of dry weight base of the leaf. Aromatic tobaccos are tobaccos that often have small, light coloured leaves. Throughout the specification, the term "aromatic tobacco" is used for other tobaccos that have a high aromatic content, e.g. of essential oils. From a sensorial perspective, aromatic tobacco is a tobacco type which, after curing, is associated with spicy and aromatic sensation. Examples for aromatic tobaccos are Greek Oriental, Oriental Turkey, semi-oriental tobacco but also Fire Cured, US Burley, such as Perique, Rustica, US Burley or Meriland. Filler tobacco is not a specific tobacco type, but it includes tobacco types which are mostly used to complement the other tobacco types used in the blend and do not bring a specific characteristic aroma direction to the final product. Examples for filler tobaccos are stems, midrib or stalks of other tobacco types. A specific example may be flue cured stems of Flue Cure Brazil lower stalk.

The cut-filler suitable to be used with the present invention generally may resemble to cut-filler used for conventional smoking articles. The cut width of the cut filler preferably is between 0.3 millimeters and 2.0 millimeters, more preferably, the cut width of the cut filler is between 0.5 millimeters and 1.2 millimeters and most preferably, the cut width of the cut filler is between 0.6 millimeters and 0.9 millimeters. The cut width may play a role in the distribution of heat inside the substrate portion of the article. Also, the cut width may play a role in the resistance to draw of the article. Further, the cut width may impact the overall density of the substrate portion.

The strand length of the cut-filler is to some extent a random value as the length of the strands will depend on the overall size of the object that the strand is cut off from. Nevertheless, by conditioning the material before cutting, for example by controlling the moisture content and the overall subtlety of the material, longer strands can be cut. Preferably, the strands have a length of between about 10 millimeters and about 40 millimeters before the strands are formed into the substrate section. Obviously, if the strands are arranged in a substrate section in a longitudinal extension where the longitudinal extension of the section is below 40 millimeters, the final substrate section may comprise strands that are on average shorter than the initial strand length. Preferably, the strand length of the cut-filler is such that between about 20 percent and 60 percent of the strands extend along the full length of the substrate portion. This prevents the strands from dislodging easily from the substrate section.

The non-liquid aerosol-forming substrate portion of the aerosol-generating article may have a length of between 20 mm and 40 mm, preferably between about 25 mm and 35 mm. In some embodiments, the aerosol-forming substrate portion of the aerosol-generating article may have a length of approximately 32 mm. The aerosol-forming substrate portion of the aerosol-generating article may have an external diameter of between approximately 4 mm and approximately 8 mm. For example, the aerosol-forming substrate portion of the aerosol-generating article may have an external diameter of between approximately 5 mm and approximately 6 mm. In some embodiments, the aerosol-forming substrate portion may have an external diameter of around 5.3 mm.

As used herein, the term 'non-liquid aerosol-forming substrate' relates to a substrate capable of releasing volatile compounds that can form an aerosol. The substrate may be non-liquid. The substrate may be provided as a gel. The substrate may be viscous. The substrate may be provided as a viscous gel. Volatile compounds may be released by heating the aerosol-forming substrate. An aerosol-forming substrate may conveniently be part of an aerosol-generating article. The aerosol-forming substrate may be liquid aerosol-forming substrate. The liquid aerosol-forming substrate may comprise other additives and ingredients, such as flavourants. If the aerosol-forming substrate is provided in liquid form, in the liquid aerosol-forming substrate, certain physical properties, for example the vapour pressure or viscosity of the substrate, are chosen in a way to be suitable for use in the aerosol generating system. The liquid preferably comprises a tobacco-containing material comprising volatile tobacco flavour compounds which are released from the liquid upon heating. The liquid may include water, ethanol, or other solvents, plant extracts, nicotine solutions, and natural or artificial flavours. Preferably, the liquid further comprises an aerosol former. Examples of suitable aerosol formers are glycerine and propylene glycol. The liquid aerosol-forming substrate may have a nicotine concentration of between about 0.5% and about 10%, for example about 2%.

If the aerosol-forming substrate is provided in a liquid form, the liquid aerosol-forming substrate may be contained in a liquid storage portion of the aerosol-generating article. The aerosol-generating article may be configured as a cartridge. The liquid storage portion is adapted for storing the liquid aerosol-forming substrate to be supplied to the heating element of the aerosol-generating device. Alternatively, the cartridge itself could comprise a heating element for vaporizing the liquid aerosol-forming substrate. In this case, the aerosol-generating device may not comprise a heating element but only supply electrical energy towards the heating element of the cartridge, when the cartridge is received by the aerosol-generating device. The liquid storage portion may comprise couplings such as self-healing pierceable membranes for facilitating supply of the liquid aerosol-forming substrate towards the heating element. The membranes avoid undesired leaking of the liquid aerosol-forming substrate stored in the liquid storage portion. A respective needle-like hollow tube may be provided to pierce through the membrane. The liquid storage portion may be configured as a replaceable tank or container.

The main body may comprise a liquid storage portion configured to hold liquid aerosol-forming substrate.

The manufacture of a one-piece main body may be an advantageous for comprising a liquid storage portion in the aerosol-generating device. Providing a liquid storage portion in the aerosol-generating device may avoid waste. The liquid storage portion, as described above, may be refilled with liquid aerosol-forming substrate. The aerosol-forming substrate may not be replaced by a new one, as it would be the case for a non-liquid aerosol-forming substrate.

The main body may be a one-piece main body, when the aerosol-generating article comprising liquid aerosol-forming substrate.

The liquid storage portion is capable of being coupled to at least one of the pumping device and the vaporiser, preferably the heating element, by a respective coupling hermetically sealed against surrounding atmosphere. Preferably, the couplings are configured as self-healing pierceable membranes. The membranes avoid undesired leaking of the liquid aerosol-forming substrate stored in the liquid storage portion. The liquid storage portion may be configured as a replaceable tank or container. For coupling the replaceable liquid storage portion to the pumping device and/or the vaporiser a respective needle-like hollow tube may be pierced through a respective membrane. When the pumping device and/or the vaporiser are coupled to the liquid storage portion, the membranes avoid undesired leaking of the liquid aerosol-forming substrate and leaking of air from and into the liquid storage portion.

The invention may further relate to a kit of mouthpieces for use in an aerosol-generating device. Each of the mouthpiece may be configured with different characteristics.

The mouthpiece from the kit of mouthpieces may be configured as removably attachable mouthpiece. The mouthpiece from the kit of mouthpieces may be configured removably attachable to the main body of the aerosol-generating device. The different characteristics may be realized by the structural configuration of the inlet portion and/or outlet portion of the two-piece Venturi portion. Each of the mouthpieces of the kit of mouthpieces may be configured as described above.

The term 'characteristics' may denote physical properties in the two-piece Venturi portion, preferably in the inlet portion and/or in the outlet portion of the two-piece Venturi portion, and/or mechanical properties of the two-piece Venturi portion, preferably of the inlet portion and/or outlet portion of the two-piece Venturi portion. Physical properties may be velocity or pressure. Different velocity or pressure, preferably pressure change, may facilitate different aerosol flow and different spatial distances of the path way. Mechanical properties may depend on the dimensions, material and/or design of the two-piece Venturi portion. Different dimensions of the two-piece Venturi portion may configured by different lengths of the inlet portion and/or outlet portion, preferably by different different outlet angles. The different characteristics may arise from different configurations of the airflow channels of the individual two-piece Venturi portions, preferably of the inlet portion and/or the outlet portions, more preferably of the outlet angles. Different material of the inlet portion and/or outlet portion of the two-piece Venturi portion may have different frictional coefficient. Different frictional coefficient may facilitate different aerosol flow rates. Different design of the two-piece Venturi portion may be a propeller or threads within the outlet portion of the two-piece Venturi portion.

The different characteristics of the two-piece Venturi portion may facilitate different aerosol generations. The characteristics may define the usage experience.

The invention may further relate to a system comprising an aerosol-generating device as described herein and an aerosol-generating article comprising aerosol-forming substrate as described herein.

Features described in relation to one aspect may equally be applied to other aspects of the invention.

The invention will be further described, by way of example only, with reference to the accompanying drawings in which:

FIG. 3 shows an embodiment, in which a heating element of the aerosol-generating device is configured as an inductive heating element.

FIG. 5 shows an embodiment, in which the heating element of the aerosol-generating device is configured as a mesh heater.

Figure 1:
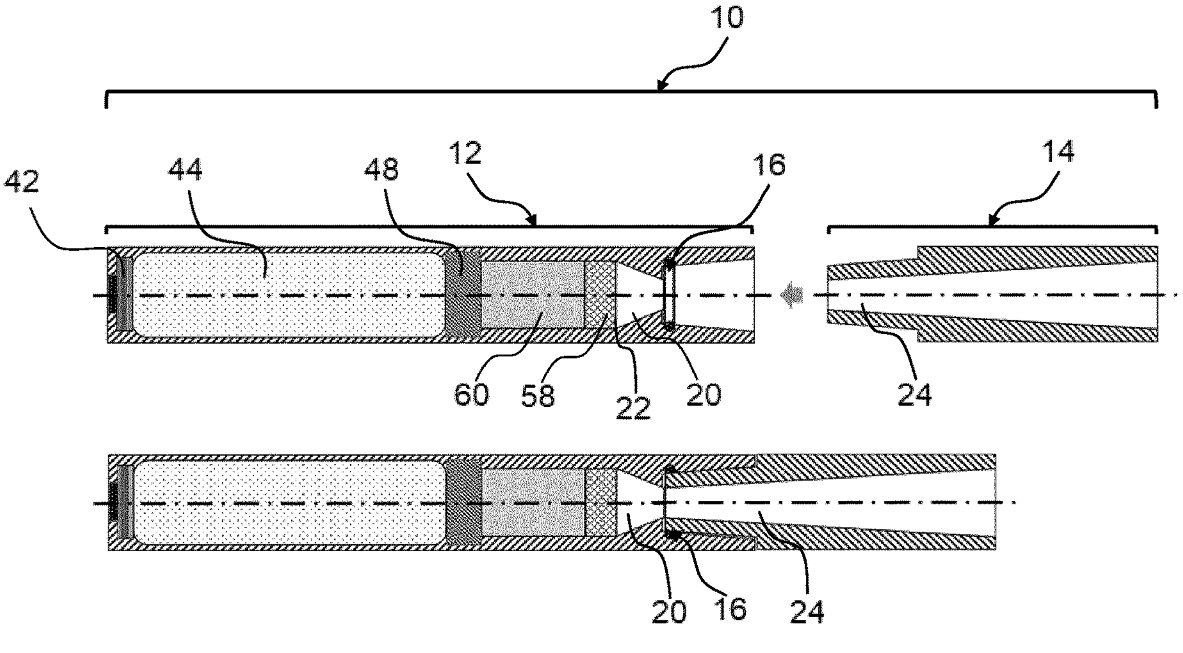
FIG. 1 shows an aerosol-generating device, in which a main body and a mouthpiece each comprise parts of a two-piece Venturi portion.

FIG. 1 shows an aerosol-generating device 10. The aerosol-generating device 10 comprises a main body 12 and a mouthpiece 14. The main body 12 comprises a charging port 42, a power supply 44, electric circuity 48 and a heating element, preferably a mesh heater 58 and a liquid storage portion 60 for holding liquid aerosol-forming substrate. The mouthpiece 14 is removably attachable to the main body 12 by a connection portion. The connection portion is in the embodiment shown in FIG. 1*a* mechanical connection portion, preferably an O-ring 16 connection portion. Next to the mesh heater 58, FIG. 1 shows a two-piece Venturi portion. The two-piece Venturi portion is in the embodiment shown in FIG. 1 a two-part element. The two-piece Venturi portion comprises an inlet portion 22, a constricted airflow channel 20 arranged in the main body 12 and an outlet portion 24 arranged in the mouthpiece 14. The constricted airflow channel 20 may be the part of a main airflow channel with the smallest diameter. The inlet portion 22 of the two-piece Venturi portion is in the embodiment shown in FIG. 1 configured as a reduction of the diameter of an airflow channel from the mesh heater 58 to the constricted airflow channel 20 of the two-piece Venturi portion. The constricted airflow channel 20 forms a constricted airflow passage for air flowing through the two-piece Venturi portion. The outlet portion 24 diverges from the constricted airflow channel 20 towards a downstream end of the two-piece Venturi portion. Due to a constricted airflow passage of the constricted airflow channel 20 in comparison to the inlet portion 22 and the outlet portion 24 of the two-piece Venturi portion, the two-piece Venturi portion utilizes the venturi effect. The venturi effect leads to reduced pressure and increased velocity in the constricted airflow channel 20 of the two-piece Venturi portion and to an expansion of the air in the outlet portion to optimize aerosol formation.

Figure 2:
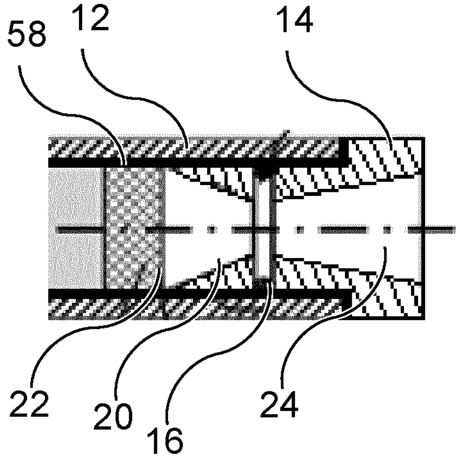
FIG. 2 shows an embodiment, in which the aerosol-generating device comprises a two-piece main body and three air inlets.

FIG. 2 shows an embodiment, in which the two-piece Venturi portion is fully integrated into the mouthpiece 14. In this embodiment, the inlet portion 22, the constricted airflow channel 20 and the outlet portion 24 are all integrally arranged in the mouthpiece 14. The mouthpiece 14 can be partly inserted into the main body 12. When the mouthpiece 14 is inserted into the main body 12, the inlet portion 22 is arranged adjacent the mesh heater 58. Downstream of the inlet portion 22, the constricted airflow channel 20 is arranged. An O-ring 16 may be arranged in order to prevent leakage. However, the O-ring 16 is optional in this embodiment. Downstream of the constricted airflow channel 20, the outlet portion 24 is arranged. The diameter of the constricted airflow channel 20 is reduced in comparison to the diameter of the inlet portion 22 and of the outlet portion 24.

As can be seen in FIG. 3, the aerosol-generating device 10 comprises a two-piece Venturi portion. The main body 12 is configured as a two-piece main body. The main body 12 comprises a first portion 12*a* and a second portion 12*b*. The first portion 12*a* is configured attachable to the second portion 12*b*. An aerosol-generating article 18 comprising aerosol-forming substrate can be inserted into a heating chamber 62 of the first portion 12*a* of the main body. The aerosol-generating article can be held between the first portion 12*a* and the second portion 12*b* of the main body 12 after the first portion 12*a* is attached to the second portion 12*b* of the main body 12. The first portion 12*a* comprises a charging port 42, a power supply 44, electric circuity 48 and a heating element. The heating element is configured as an internal heating element, preferably a heating pin 50. The heating pin 50 runs through the the center of the aerosol-generating article 18, preferably through a substrate portion 36 of the aerosol-generating article 18 containing the aerosol-forming substrate. The second portion 12*b* comprises an inlet portion 22 of the two-piece Venturi portion. The second portion 12*b* further comprises a first part 20*a* of a constricted airflow channel 20 of the two-piece Venturi portion. Part of the heating pin 50 and part of the aerosol-generating article 18, preferably a filter portion 38 of the aerosol-generating article 18, may extend into the second portion 12*b* of the main body 12. The mouthpiece 14 comprises a second part 20*b* of the constricted airflow channel 20 and an outlet portion 24 of the two-piece Venturi portion. The mouthpiece 14 and the main body 12 may be, as shown in FIG. 3*a*, detached. In FIG. 3*b*, the main body 12 and the mouthpiece 14 are attached. The main body 12 comprises a first air inlet 26 at the first portion 12*a* of the main body 12, preferably upstream to the aerosol-generating article 18. A second air inlet 30 is provided at the mouthpiece 14, preferably adjacent the constricted airflow channel 20, more preferably adjacent the second part 20*b* of the constricted airflow channel 20. The aerosol-generating device 10 may comprise a third air inlet 32 at the main body 12, preferably downstream of the inlet portion 22 of the two-piece Venturi portion. The third air inlet 32 is preferably arranged at the second portion 12*b* of the main body 12. The air inlets 26, 30 and 32 may each be a pair of two air inlets, preferably arranged at two opposite sides of the main body 12 or the mouthpiece 14, as shown in FIG. 3*b*. The first air inlet 26 is fluidly connected with a main airflow channel 28. The main airflow channel 28 is the airflow channel of the two-piece Venturi portion. The second air inlet 30 is fluidly connected with a secondary airflow channel. The second air flow channel is the airflow channel of the second air inlet 30. The aerosol generating article 18 comprises in this embodiment shown in FIG. 3*c* a non-liquid aerosol-forming substrate comprising a filter portion 38, preferably a hollow acetate tube, and a substrate portion 36 comprising the non-liquid aerosol-forming substrate. The main body 12 and the mouthpiece 14 are connected to each other by a connection portion. The connection portion has a first connection portion 40*a* at the main body 12 and a second connection portion 40*b* at the mouthpiece 14. The connection portion is in the embodiment shown in FIG. 3*a* a male-female connection portion. The male connection portion is the first connection portion 40*a* and the female connection portion is the second connection portion 40*b*. FIG. 3*a* shows the main body 12 detached to the mouthpiece 14. FIG. 3*b* shows the main body 12 attached to the mouthpiece 14.

Figure 4:
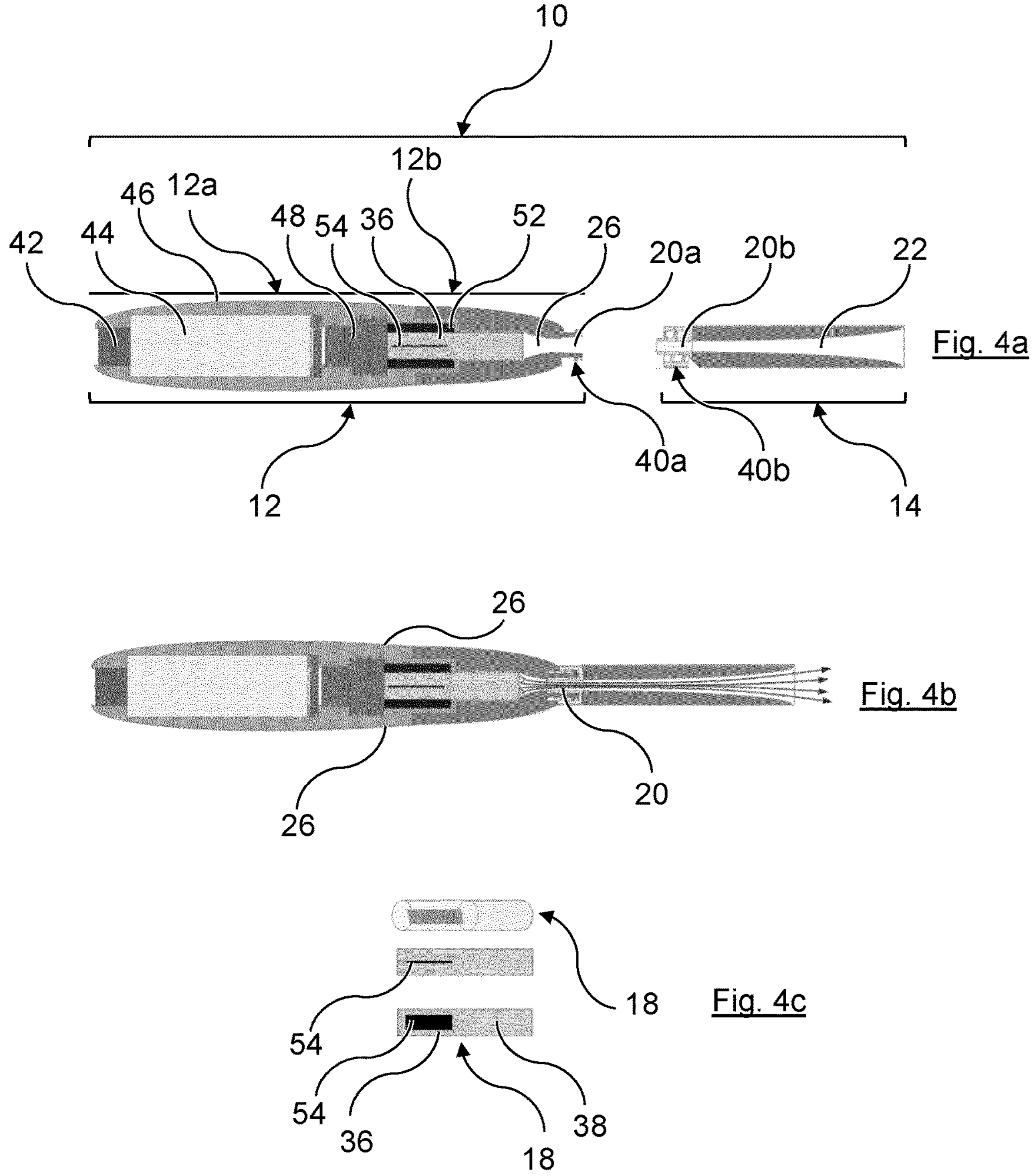
FIG. 4 shows an embodiment of the aerosol-generating device, in which an aerosol-forming substrate is provided in liquid form in a liquid storage portion, downstream of which a mesh heater is provided.

FIG. 4 shows an embodiment, in which the heating element is a inductive heating element comprising a inductive coil 52 and a susceptor 54. The susceptor 54 is embedded in the aerosol generating article 18, preferably in the substrate portion 36, as shown in FIG. 4*c*. The main body 12 and the mouthpiece 14 are connected to each other by a connection portion similar to the connection portion depicted in FIG. 3.

FIG. 5 shows an embodiment, in which the heating element is a mesh heater 58 and the main body 12 is a one piece main body. The main body 12 comprises in this embodiment shown in FIGS. 5*a* and 5*b*, a liquid storage portion 60. The liquid storage portion 60 comprises liquid aerosol-forming substrate. The mesh heater 58 is arranged downstream of the liquid storage portion 60, preferably spanning an opening of the liquid storage portion 60. The opening of the liquid storage portion is provided at the downstream end of the liquid storage portion 60. The mesh heater 58 extends across the opening of the liquid storage portion. The main body 12 comprises an air inlet 56 upstream of the inlet portion 22 of the two-piece Venturi portion.

The invention claimed is:

1. Aerosol-generating device comprising:

a main body;

a mouthpiece comprising a downstream end, which is configured removably attachable to the main body; and a two-piece Venturi portion, wherein the two-piece Venturi portion comprises an inlet portion, an outlet portion, a main airflow channel extending between the inlet portion and the outlet portion and a constricted airflow channel arranged in the main airflow channel;

wherein the inlet portion is integrated with the main body, and the outlet portion is at the downstream end of the mouthpiece;

wherein the aerosol-generating device interacts with an aerosol-forming substrate of an aerosol-generating article to generate an aerosol, wherein the two-piece Venturi portion is located immediately downstream of the aerosol-generating article comprising a solid aerosol-forming substrate as the aerosol-forming substrate and abuts the aerosol-generating article, or wherein the two-piece Venturi portion is located immediately downstream of the aerosol-generating article comprising a cartridge holding a liquid aerosol-forming substrate as the aerosol-forming substrate and abuts the cartridge; and wherein the inlet portion of the two-piece Venturi portion is a hollow conical shape converging towards the constricted airflow channel of the two-piece Venturi portion for entry of airflow into the two-piece Venturi portion and the outlet portion of the two-piece Venturi portion comprises a hollow conical shape diverging from the constricted airflow channel for airflow out of the two-piece Venturi portion.

2. Aerosol-generating device according to claim 1, wherein the device further comprises at least one first air inlet arranged adjacent or upstream of the inlet portion, wherein the first air inlet is fluidly connected with the main airflow channel.

3. Aerosol-generating device according to claim 1, wherein the device comprises at least one second air inlet arranged adjacent the main airflow channel, wherein the second air inlet is fluidly connected with the main airflow channel.

4. Aerosol-generating device according to claim 3, wherein the second air inlet is fluidly connected with the main airflow channel at the constricted airflow channel.

5. Aerosol-generating device according to claim 1, wherein the constricted airflow channel is configured as a venturi nozzle.

6. Aerosol-generating device according to claim 1, wherein the inlet portion is configured converging towards the main airflow channel and the outlet portion is configured diverging from the main airflow channel.

7. Aerosol-generating device according to claim 1, wherein the main body comprises a first portion of the main airflow channel, and the mouthpiece comprises a second portion of the main airflow channel.

8. Aerosol-generating device according to claim 7, wherein the first portion of the main airflow channel of the two-piece Venturi portion comprises a first portion of a venturi nozzle, and the second portion of the main airflow channel comprises a second portion of a venturi nozzle.

9. Aerosol-generating device according to claim 1, wherein the main body comprises a first portion and a second portion, wherein the second portion is configured removably attachable to the first portion, wherein the inlet portion of the two-piece Venturi portion is arranged in the second portion of the main body, and wherein the main body is configured such that an aerosol-generating article comprising aerosol-forming substrate is insertable into a heating chamber of the main body, when the first portion and the second portion of the main body are detached.

10. Aerosol-generating device according to claim 9, wherein the aerosol-generating device comprises an internal heating element arranged in the heating chamber and configured for penetrating into the aerosol-forming substrate of the aerosol-generating article, when the aerosol-generating article is inserted into the heating chamber.

11. Aerosol-generating device according to claim 9, wherein the aerosol-generating device comprises an induction coil arranged at least partly surrounding the heating chamber.

12. Aerosol-generating device according to claim 1, wherein the main body comprises a liquid storage portion configured to hold liquid aerosol-forming substrate.

13. Aerosol-generating device according to claim 12, wherein the aerosol-generating device comprises a heating element arranged downstream of the liquid storage portion.

14. Aerosol-generating device according to claim 10, wherein the heating element is configured as an electrically resistive heating element or inductive heating element comprising susceptor material.

15. Aerosol-generating device according to claim 10, wherein the internal heating element comprises a heating pin.

16. Aerosol-generating device according to claim 10, wherein the internal heating element comprises a heating blade.

17. Aerosol-generating device according to claim 13, wherein the heating element comprises a mesh heater.

18. Aerosol-generating device according to claim 13, wherein the heating element comprises a coil and wick heater.

19. System comprising an aerosol-generating device according to claim 1 and an aerosol-generating article comprising aerosol-forming substrate.

* * * * *